United States Patent [19]

Fesman

[11] Patent Number: 4,544,678
[45] Date of Patent: Oct. 1, 1985

[54] FILLED OR EXTENDED POLYURETHANE FOAM CONTAINING POLYETHYLENE GLYCOL SOFTENING AGENT

[75] Inventor: Gerald Fesman, Teaneck, N.J.

[73] Assignee: Stauffer Chemical Company, Westport, Conn.

[21] Appl. No.: 672,523

[22] Filed: Nov. 19, 1984

[51] Int. Cl.$^4$ .............................................. C08G 18/14
[52] U.S. Cl. ................................... 521/107; 252/182; 521/120; 521/131; 521/174
[58] Field of Search ............... 521/107, 120, 174, 131; 252/182

[56] References Cited

U.S. PATENT DOCUMENTS

| | | | |
|---|---|---|---|
| 3,298,976 | 1/1967 | Reinhart | 521/123 |
| 3,857,800 | 12/1974 | Fishbein et al. | 521/174 |
| 3,857,802 | 12/1974 | Larkin et al. | 521/107 |
| 3,945,939 | 3/1976 | Barron | 521/174 |
| 4,315,082 | 2/1982 | Beacham et al. | 521/907 |
| 4,452,924 | 6/1984 | Radovich | 521/111 |
| 4,452,930 | 6/1984 | Moriarity | 524/507 |

FOREIGN PATENT DOCUMENTS 1396300  6/1975  United Kingdom .

*Primary Examiner*—Maurice J. Welsh
*Attorney, Agent, or Firm*—Richard P. Fennelly

[57] ABSTRACT

The softness of filled polyurethane foams is enhanced by the incorporation in the formulation used to make the foam of a polyethylene glycol softening agent. Generally, from about 2 to about 12 parts by weight of polyethylene glycol can be used in the foam formulation. Use of this glycol softening agent obviates the need for relatively high amounts of halogenated hydrocarbon auxiliary blowing agents with the water blowing agent normally used and this obviates the foam processing instability which can result from use of such high levels of auxiliary blowing agent. If desired, the polyethylene glycol softening agent can be combined with a liquid compatible plasticizer (e.g. a phosphate or phthalate plasticizer) to ensure that it is in a liquid form for processing ease of the foamable formulation used to make the foam.

13 Claims, No Drawings

FILLED OR EXTENDED POLYURETHANE FOAM CONTAINING POLYETHYLENE GLYCOL SOFTENING AGENT

BACKGROUND OF THE INVENTION

1. Field of the Invention

The present invention relates to filled or extended polyurethane foams containing a polyethylene glycol softening agent. These materials are useful as cushioning materials.

2. Description of the Prior Art

It is known to make highly filled, flexible polyurethane foams which contain relatively high amounts of filler. The filler is added to increase the density of the foam which is used as a cushioning material. This added density acts to reduce the "wing-out" or "butterflying" of the foams which results when a person sits in the center of the foam causing its sides to be raised. The addition of the filler reduces this undesirable "winging-out" of the foams. In addition, the sag factor (ratio of 65% IFD [indentation force deflection]/25% IFD) is increased thereby improving the weight supporting properties of the material which reduces "bottoming out". One example of a prior art patent showing the general type of foams to which the present invention relates is U.S. Pat. No. 3,298,976 to M. H. Rinehart.

The presence of filler in such highly filled flexible polyurethane foams interferes with the normal processing operations needed to produce the foams for example the pouring of a liquid foamable composition onto a conveyor for transfer to the foaming stage can be adversely affected by the presence of high levels of the filler. The catalyst balance of the liquid foamable composition is changed by the "heat sink" effects caused by the high filler loading. It has been common practice in regard to the manufacture of such foams to use relatively high levels of auxiliary blowing agents (e.g. halohydrocarbon auxiliary blowing agents) with a lower level of waterblowing agent in an effort to give greater softness (i.e., lower load bearing characteristics) to the foams while maintaining roughly the same density desired. The use of these higher halohydrocarbon/lower water blowing agent compositions has led to certain disadvantages in the foaming operation, namely, a certain degree of foaming instability as exhibited by the presence of voids, splits, fissures and, in some instances, partial foam collapse.

Hence, a need exists in the art to allow for an additive to give a softer filled polyurethane foam of the aforementioned type while allowing the foamer to utilize generally higher water and lower halohydrocarbon auxiliary blowing agent levels than hitherto possible in achieving such a soft foam.

DESCRIPTION OF THE PRESENT INVENTION

The present invention relates to the use of a polyethylene glycol additive to the aforementioned type of highly filled, flexible polyurethane foam formulations to enhance the softness of the resulting foam without the use of the higher levels of halohydrocarbon auxiliary blowing agent generally normally needed to achieve such a soft foam. One additional novel aspect of the present invention is a liquid mixture of polyethylene glycol softening agent and a suitable liquid plasticizer compatible with the polyethylene glycol for such filled foams.

DETAILED DESCRIPTION OF THE PRESENT INVENTION

The polyols which are intended for use in the foam formulation of the present invention are polyether triols such as known to the prior art. These materials are propylene oxide adducts of glycerine and propylene oxide/ethylene oxide adducts of glycerine. For example, one material which is suitable for use with the present invention is a polypropylene or a poly(propylene/ethylene) ether polyol having an average molecular weight of 2500 to 6500. Both primary and secondary hydroxyl capped polyols may be used. If the amount of polyol used in the foam formulation is expressed as 100 parts by weight, the other materials in the formulation, as will be described in greater detail below, wll have their weight amounts set forth as parts by weight of such additives using 100 parts by weight of polyol as the basis.

The foam formulation of the present invention also contains as an essential additive, a relatively high loading of filler to give the desired degree of added weight to the resulting foam. Representative examples of filler include barium sulfate, calcium carbonate, clay materials, or any other heavy mineral material of a suitable particle size for inclusion in the foam formulation (e.g., fine sand or crushed granite). Mixtures of the aforementioned materials can be used. In general, the particle size of the filler is not critical and can range anywhere from about 5 microns to about 50 microns or greater. Generally, about 50 to 150 parts by weight of filler is used for every 100 parts by weight of polyol.

Water is another essential ingredient of the foam formulation and is generally present at from about 1.5 to 3 parts by weight of water per 100 parts by weight of polyol. This is a conventional material and is used in generally conventional amounts.

An optional, but highly preferred ingredient is a halogenated hydrocarbon auxiliary blowing agent, for example, a fluorocarbon blowing agent such as trichlorofluoromethane. Methylene chloride can also be used as the halogenated hydrocarbon blowing agent. The blowing agent can be used at up to about 10 parts by weight based upon 100 parts by weight of the polyol.

Another essential ingredient in the foam formulation is a suitable isocyanate reactant for the polyol as is conventional in the art. Toluene diisocyanate is but one of a number that can be utilized. Generally this ingredient will be present at from 25 parts by weight to about 40 parts by weight per 100 parts by weight of polyol.

Optionally, and preferably, the foam formulation also contains various catalysts to control the blowing or the gelation of the foam formulation. For example, tertiary amines form one class of suitable blowing catalysts that can be used to control the density of the foam formulation. These materials are used in relatively low amounts, e.g. from about 0.05 to about 0.5 part by weight of the foam formulation. Gelation catalysts, for example, organic metallic compounds such as dibutyltin dilaurate and stannous octoate, can also be included in the foam formulation, if desired. It is generally preferred that they be included and representative amounts can range from about 0.1 to about 0.5 part by weight per 100 parts by weight of polyol in the foam formulation.

In order to achieve the advantages of the present invention, it has been found in accordance with the present invention that it is necessary to include a polyethylene glycol softening agent. Generally, the average molecular weight of this softening agent will range from about 200 to 4000, preferably from about 400 to 1500. The glycol softening agent can be a neat glycol or a mixture of compatible glycols of the above type. The material should be liquid so that it is readily pumpable for processing ease. If desired, a liquid polyethylene glycol can be used or a mixture of a suitable solvent (e.g., water or plasticizer) with a non-liquid glycol. Less preferably, the glycol softening agent can be made liquid by appropriate heating. The amount used should be an effective amount to give the desired degree of softness and generally can range from about 2 to about 12 parts by weight of polyethylene glycol per 100 parts by weight of polyol. In those instances where the molecular weight of the polyethylene glycol yields a semi-solid or solid material, it has been found, in accordance with one aspect of this invention, that the polyethylene glycol can be made liquid by being combining it with an effective amount of a compatible liquid plasticizer such as an alkylated aryl phosphate, alkylated alkylaryl phosphate, or dialkyl phthalate plasticizer. The plasticizer can be a flame retardant plasticizer, if desired, e.g., by being a chlorinated alkyl phosphate ester. The amount of liquid compatible plasticizer which can be used can range up to about 25% by weight of the polyethylene glycol that is employed. It is believed that this blend of polyethylene glycol and compatible liquid plasticizer is another novel aspect of the present invention.

The foregoing is intended to illustrate certain embodiments of the present invention. The following Examples illustrate the invention in greater detail and teach certain embodiments thereof.

EXAMPLES 1-3

The following ingredients were used, as described in greater detail below, to make filled foams. All amounts are given in parts by weight or percentages by weight unless otherwise stated.

| Ingredient | Foam Formulation | | |
|---|---|---|---|
|  | 1 | 2 | 3 |
| Polyether triol (NIAX 16-56) | 100 | 100 | 100 |
| Barium sulfate filler | 100 | 100 | 100 |
| Water blowing agent | 2.2 | 2.2 | 2.2 |
| Catalyst[1] | 0.12 | 0.12 | 0.12 |
| Triethylene diamine catalyst[2] | 0.12 | 0.12 | 0.12 |
| Fluorocarbon auxiliary blowing agent[3] | 6.0 | 6.0 | 6.0 |
| Polysiloxane oxyalkylene block copolymer surfactant[3a] | 1.4 | 1.4 | 1.4 |
| Catalyst[4] | 0.40 | 0.40 | 0.40 |
| Toluene diisocyanate[5] | 32.6 | 33.3 | 34.3 |
| Polyethylene glycol[6] | 0 | 5 | 7 |

[1] NIAX A-1 brand, 70% bis(2-dimethylaminoethyl) ether solution in dipropylene glycol.
[2] DABCO 33 LV brand, 33% triethylene diamine in dipropylene glycol.
[3] FREON 11 brand, trichlorofluoromethane
[3a] NIAX L5810 brand.
[4] T-10 brand, 50% stannous octoate in dioctyl phthalate
[5] 80:20, 80% 2,4-isomer and 20% 2,6-isomer. The TDI index of all formulations given above was 107
[6] 80% polyethylene glycol, 600 average mole. wt. blended with 20% of Phosflex 71B phosphate ester plasticizer, a butylated triphenyl phosphate material from Stauffer Chemical Company.

The foam was formulated as follows:

1. The polyol and barium sulfate solid filler were premixed to give a suspension of the solids. A factor of seven times was used to obtain the weight of materials to employ (e.g., 700 gm. of polyol and 700 gm. of barium sulfate were used).
2. The water, catalysts (DABCO 33LV and NIAX A-1 brands), auxiliary blowing agent, surfactant and polyethylene glycol/plasticizer mixture were all premixed into the polyol/barium sulfate suspension.
3. The gelation catalyst (T-10 brand) was added separately to the resulting mixture and was mixed in for several seconds.
4. Immediately afterward, the toluene diisocyanate was added to the total premix and mixed for several seconds. The total mix was then immediately poured into a box 16 in. (40.64 cm)×16 in. (40.64 cm)×5 in. (12.7 cm) to yield a foam 15 in. (38.1 cm)×15 in. (38.1 cm)×4 in. (10.16 cm) so that the indentation force deflection (IFD) could be measured.

Listed below are certain physical properties for the above foam formulations. Foam 1 is a control, whereas 2 and 3 are in accordance with the present invention:

| Physical Property | Foam | | |
|---|---|---|---|
|  | 1 | 2 | 3 |
| Rise Time (sec) | 180 | 183 | 185 |
| Cream Time (sec) | 7 | 7 | 7 |
| 25% IFD[1] (lbs) | 30.9 | 29.8 | 26.9 |
| (kg) | 14.02 | 13.52 | 12.20 |
| Density (lb/ft³) | 3.34 | 3.37 | 3.37 |
| (kg/cm³) | 53.50 | 53.98 | 53.98 |

[1] 25% IFD is the amount of force required to compress the sample to 75% of its original height. Lower numbers are indicative of a softer foam.

The above data illustrate that the polyethylene glycol-containing formulations result in forms having a lower 25% IFD value (i.e., they are softer foams).

The foregoing examples are merely intended to illustrate certain preferred embodiments of the present invention and should therefore only be construed in a limiting fashion. The scope of protection that is sought is given in the claims which follow.

I claim:

1. A foam formulation for preparing a filler-extended polyurethane foam having improved softness which comprises, as essential ingredients: polyether triol polyol, filler, isocyanate, water, and an effective amount for such enhanced softness of a liquid polyethylene glycol.

2. A formulation as claimed in claim 1 wherein the triol is a polypropylene ether triol.

3. A formulation as claimed in claim 1 wherein the filler is present at from about 50 to 100 parts by weight for every 100 parts by weight of polyol.

4. A formulation as claimed in claim 1 wherein the filler is barium sulfate.

5. A formulation as claimed in claim 1 which also contains a halogenated hydrocarbon auxiliary blowing agent.

6. A formulation as claimed in claim 5 wherein the auxiliary blowing agent is a fluorocarbon blowing agent.

7. A formulation as claimed in claim 1 wherein the polyethylene glycol is present at from about 2 to 12 parts by weight per 100 parts by weight of polyol and has a molecular weight of from about 200 to 4000.

8. A formulation as claimed in claim 7 wherein the molecular weight is from about 400 to 1500.

9. A foam formed from the foam formulation of any of claims 1-8.

10. A liquid mixture of polyethylene glycol and a compatible plasticizer for said polyethylene glycol for use in softening filler-extended polyurethane foams.

11. A mixture as claimed in claim 10 wherein the polyethylene glycol has a molecular weight of from about 200 to 4000.

12. A mixture as claimed in claim 11 wherein the molecular weight is from about 400 to 1500.

13. A mixture as claimed in any of claims 10-12 wherein the plasticizer is present at up to about 25% by weight of the polyethylene glycol and is a phosphate ester plasticizer.

* * * * *